United States Patent
Boelaars

(10) Patent No.: US 6,568,522 B1
(45) Date of Patent: May 27, 2003

(54) ACCUMULATION SYSTEM

(75) Inventor: Henk W. M. Boelaars, Almere (NL)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/063,823

(22) Filed: May 16, 2002

(51) Int. Cl.⁷ .............................................. B65G 37/00
(52) U.S. Cl. .................. 198/347.2; 198/347.3
(58) Field of Search .......................... 198/347.1, 347.2, 198/347.3, 452, 453, 457.05

(56) References Cited

U.S. PATENT DOCUMENTS

| | | | |
|---|---|---|---|
| 2,988,195 A | * 6/1961 | McHugh, Jr. | 198/347.1 |
| 3,353,651 A | * 11/1967 | Witmer | 198/347.2 |
| 3,465,868 A | * 9/1969 | Donner | 198/347.2 X |
| 3,669,241 A | * 6/1972 | Chalich | 198/347.3 |
| 3,835,983 A | * 9/1974 | Horii | 198/452 X |
| 4,231,469 A | 11/1980 | Arscott | |
| 5,238,099 A | 8/1993 | Schroeder et al. | |
| 5,489,016 A | * 2/1996 | Welch | 198/347.2 |
| 5,551,543 A | 9/1996 | Mattingly et al. | |
| 6,148,990 A | 11/2000 | Lapeyre et al. | |
| 6,260,688 B1 | 7/2001 | Steeber et al. | |

OTHER PUBLICATIONS

Polyketting, "Multiwheel Conveyor" catalog, date unknown, Zelhem, Netherlands.

Intralox, Inc., "Intralox Engineering Manual 2001," 2001, Harahan, Louisiana, USA.

* cited by examiner

Primary Examiner—James R. Bidwell
(74) Attorney, Agent, or Firm—James T. Creavich

(57) ABSTRACT

An accumulation system for a mass of high-friction articles, such as tires, in which a roller-top belt is used in a transfer conveyor to transfer overflow to an accumulation table. The transfer conveyor forms a segment of a conveyor line. The accumulation table is disposed next to a transfer side of the transfer conveyor to receive overflow from the transfer conveyor as upstream supply exceeds downstream demand. As downstream demand exceeds upstream supply, the accumulation table delivers accumulated articles back to the transfer conveyor. Rollers rotatable about axes in the conveying direction support articles on the transfer conveyors in low-friction rolling contact and direct overflow toward and receive accumulated articles from the accumulation table.

6 Claims, 4 Drawing Sheets

ACCUMULATION SYSTEM

BACKGROUND OF INVENTION

This invention relates to conveyor systems having power-driven conveyor sections and, more particularly, to apparatus for accumulating conveyed articles along a conveyor line as the upstream supply of articles exceeds the downstream demand.

One of the most common article accumulation systems used on conveyor lines is the bi-di (bidirectional) table. Typically, a bi-di table includes a bidirectional conveyor belt arranged to run perpendicular to a main conveyor belt running along a portion of the main conveyor line. As the upstream supply of articles exceeds the downstream demand, articles build up on the main conveyor belt. Backpressure from the backed-up mass of upstream articles pushes articles onto the bi-di table, which runs in a direction away from the main conveyor line to make room for more of the excess articles. As the downstream demand increases, the direction of the bi-di belt is reversed to push the articles accumulated on the bi-di table back onto the main conveyor belt to meet the downstream demand. Instead of a bidirectional conveyor belt, other accumulation tables use a pusher bar that retracts to allow overflow onto the table and that pushes accumulated articles back onto the main conveyor belt as downstream demand increases.

In conveyor lines of this kind, the main conveyor belt is usually a rubber, plastic, or metal conveyor belt or chain across which the articles slide as the backpressure builds up or as the bi-di table transfers articles onto the main conveyor belt. This works well for many articles, such as cans and bottles. But some articles, such as tires, made of rubber or rubber-like materials do not slide so easily across flat belt surfaces because of friction. For these high-friction articles, some sort of pushing mechanism is often required to slide the articles across the belts. But the pushing mechanisms do not decrease the belt-to-article friction; they merely overcome it at the expense of added complexity, power consumption, and cost.

Thus, there is a need for a simple accumulation system that is especially effective with high-friction articles, such as tires.

SUMMARY OF INVENTION

This need and others are satisfied by an accumulation system embodying features of the invention. The accumulation system is part of a conveyor line conveying a mass of articles in a conveying direction. A transfer conveyor forms a segment of the conveyor line. The transfer conveyor line extends from an upstream end to a downstream end in the conveying direction. It extends laterally from a first transfer side to an opposite second side. An accumulation table is positioned next to the conveyor line at the first transfer side of the transfer conveyor. The accumulation table receives articles from the transfer conveyor as the upstream supply of articles exceeds the downstream demand. As the downstream demand exceeds the upstream supply, the accumulation table delivers accumulated articles to the transfer conveyor. The transfer conveyor comprises a roller-top conveyor belt traveling in the conveying direction. Salient portions of the rollers extend from the belt to support conveyed articles. The rollers are arranged to rotate about axes generally in the conveying direction to direct articles toward and to receive articles from the accumulation table.

Thus, the rollers effectively reduce the friction between the conveyor and the conveyed articles they support in low-friction rolling, rather than high-friction sliding, contact.

BRIEF DESCRIPTION OF DRAWINGS

These and other advantages, features, and aspects of the invention are better understood by referring to the following description, appended claims, and accompanying drawings, in which:

DETAILED DESCRIPTION

Figure 1:
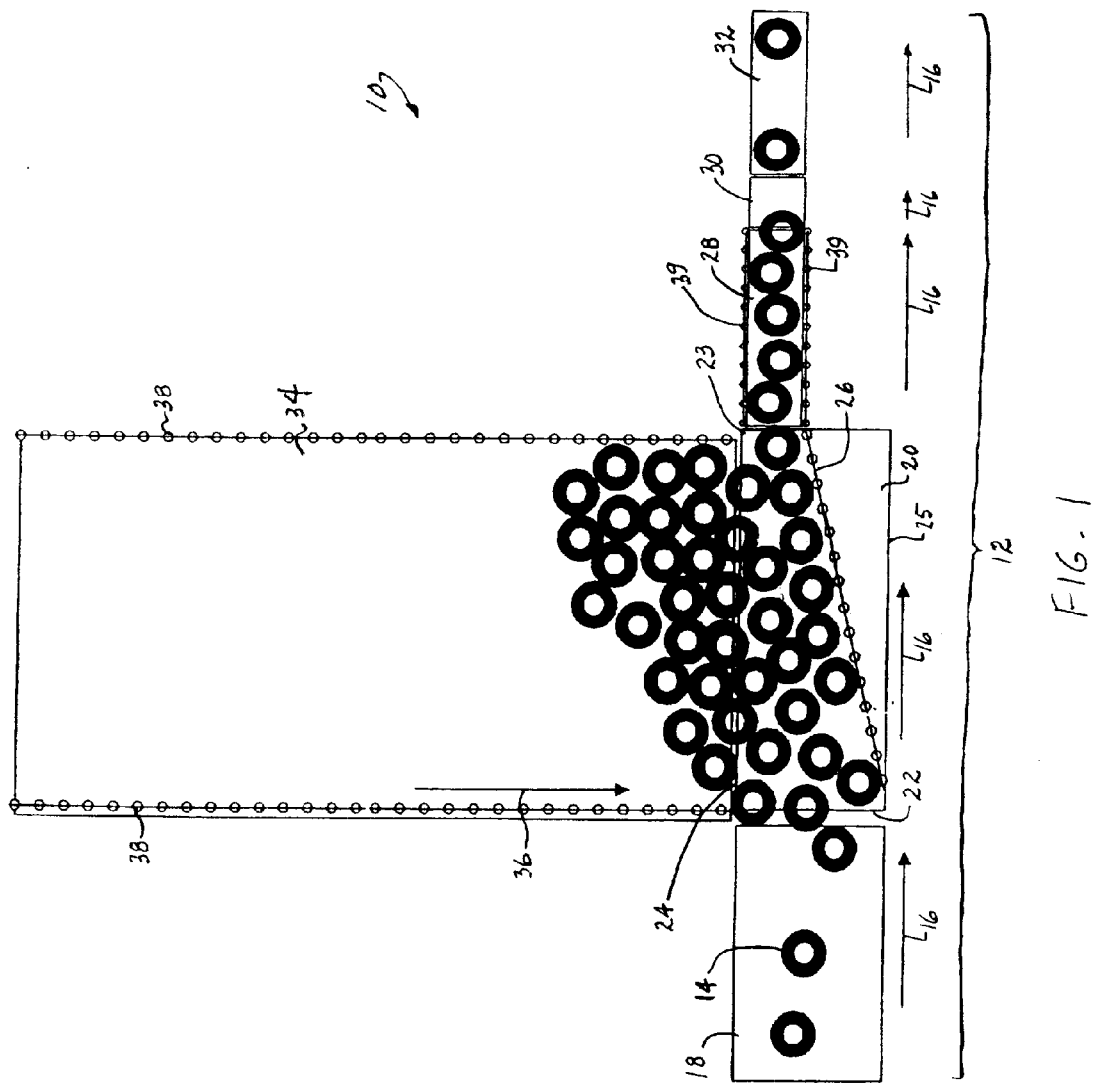
FIG. 1 is an overhead schematic of a conveyor line having an accumulation system embodying features of the invention.

A conveyor for tires is shown in FIG. 1 with an accumulation system embodying features of the invention. The conveyor 10 has a main conveyor line 12 composed of a number of conveyor segments transporting articles, in this case, tires 14, in a conveying direction 16 from left to right in FIG. 1. An infeed conveyor 18 supplies a mass of tires to a transfer conveyor 20 positioned just downstream of the infeed conveyor. The transfer conveyor extends from an upstream end 22 to a downsteam end 23 in the conveying direction and laterally from a first transfer side 24 to an opposite second side 25. A guide rail 26 is obliquely arranged on the transfer conveyor. The upstream end of the guide rail is closer to the second side of the transfer conveyor than is the downstream end. In this way, the mass of tires is funneled toward the adjacent downstream segment of the conveyor line, an in-line accumulator 28, shown in FIG. 1 as narrower than the upstream segments to convey tires in a single file. The next in-line segment is an indexing conveyor 30, which acts as a brake to allow tires to accumulate one after another on the in-line accumulator. When a tire is demanded downstream, the indexing conveyor transfers a tire to an outfeed conveyor 32, which conveys the tire to downstream processing stations.

Often the upstream supply of tires exceeds the downstream demand. In that circumstance, the overflow of tires is handled by an accumulation table 34 disposed perpendicular to the transfer conveyor at its first transfer side. The overflow is transferred over the transfer side of the transfer conveyor onto the accumulation table. If the downstream demand exceeds the upstream supply, the tires on the accumulation table are urged back onto the transfer conveyor in the direction of arrow 36. The accumulation table and the in-line accumulator are preferably flanked by low-friction side rails 38, 39 to reduce friction between the tires and the rails in mass-flow regions.

In a preferred version of the accumulation system and the conveying system, each of the major conveying segments is realized by a modular plastic conveyor belt driven in the direction of the arrows 16, 36. For example, each of the conveyor segments can be constructed using modular plastic conveyor belts manufactured and sold by Intralox, Inc. of Harahan, La., USA. For example, the infeed conveyor 18 and the outfeed conveyor 32 can be made using an INTRALOX Series 400 Flush Grid belt. The transfer conveyor 20 can be made using a Series 400 Transverse Roller Top belt. The accumulation table 34 and the in-line accumulator 28 can be made using Series 400 Roller Top belts of different widths. The indexing conveyor 30 can be made with a Series 1400 Flat Friction Top belt, in which the rubber-top surface acts as a brake to stop the flow of tires. The indexing belt can then be advanced to deliver a tire to the outfeed conveyor on demand. All of these belts are described in the INTRALOX Modular Plastic Conveyor Belts Engineering Manual 2001, published by Intralox, Inc., and incorporated herein by reference.

Figure 2:
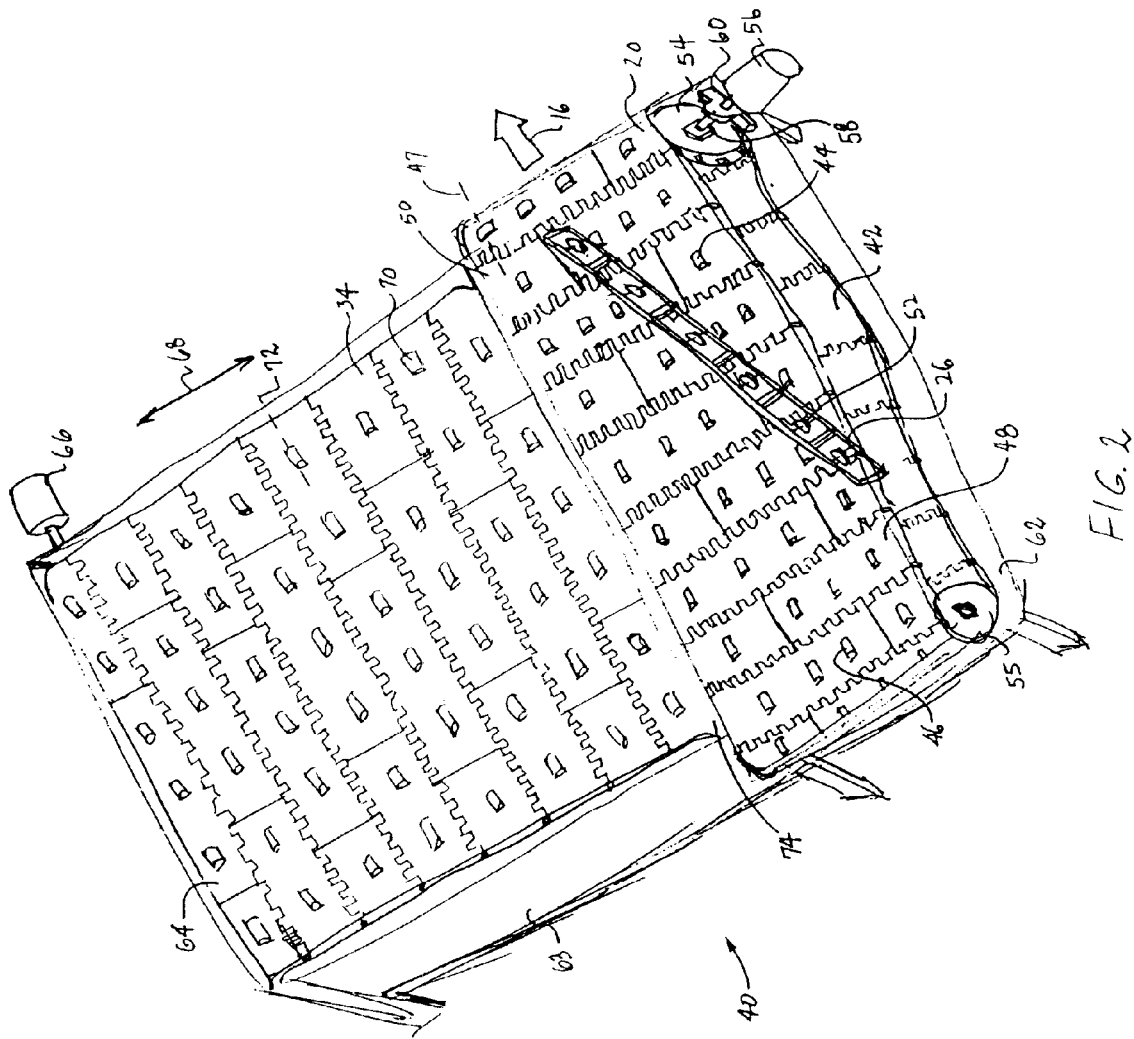
FIG. 2 is an isometric view of one version of an accumulation system usable in the conveyor line of FIG. 1.
Figure 3:
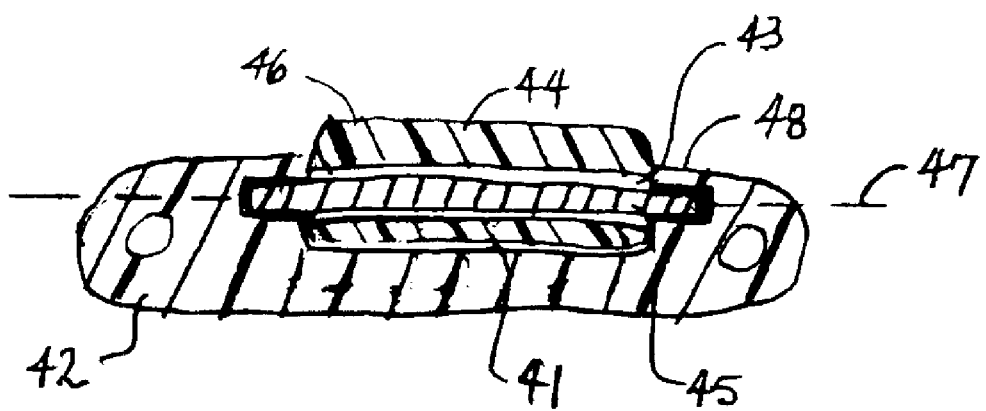
FIG. 3 is a cross-sectional view through the roller axle of a portion of a transfer conveyor belt usable in the accumulation system of FIG. 2.

One version of the accumulation system for use with a conveyor as in FIG. 1 is shown in FIG. 2. The accumulation system 40 includes a transfer conveyor 20 and an adjacent accumulation table 34. The transfer conveyor uses a transverse roller-top belt 42 with rollers 44 arranged to rotate about axes 47 generally in the conveying direction 16. As shown in detail in FIG. 3, the rollers, cylindrical in this version, include a salient portion 46 extending from a belt cavity 41 past the top outer conveying surface 48 of the belt. The conveyed articles, such as tires, are supported atop the rollers. The cylindrical rollers include a central bore 43 that receives an axle 45 that defines the roller axis 47 and about which the roller rotates. A guide rail 26 extends obliquely across the belt to funnel articles toward an exit 50 at the downstream end of the transfer conveyor. In this version, the guide rail 26 includes rollers 52 on vertical axles for low-friction rolling contact with tires. The transfer conveyor belt is looped between drums or sprocket sets 54, 55 at the downstream and upstream ends. A motor 56 is coupled to a drive shaft 58 supported on a bearing block 60 to drive the belt in the conveying direction. The belt, the drive components, and the guide rail are all supported in a conveyor frame 62.

The accumulation table 34 in this version is supported in a frame 63. The table includes a roller-top belt 64 looped around sprocket sets at each end in the manner of the transfer belt. A drive motor 66 can preferably drive the belt bidirectionally as indicated by two-headed arrow 68. Unlike the rollers in the transfer belt, rollers 70 in the accumulation table belt preferably rotate about axes 72 perpendicular to the direction of travel 68 of the accumulation table belt, or parallel to the axes 47 of the rollers 44 on the transfer belt, to receive tires from and direct them back onto the transfer belt.

As the upstream supply of tires exceeds the downstream demand, the oversupply of tires builds up on the transfer belt and overflows onto the accumulation table across the gap 74 separating them. The accumulation table belt 64 can be driven away from the transfer belt to aid in the acceptance of the overflow. Alternatively, the accumulation table belt could be stopped or even driven constantly toward the transfer belt. In such cases, the backpressure caused by the oversupply is sufficient to push the overflow atop the rollers onto the accumulation table even against the motion of the accumulation table belt. Once the downstream demand begins to exceed the upstream supply, the accumulation table belt is driven toward the transfer belt to deliver the accumulated tires back to the main conveyor line. The rollers on the accumulation table belt allow the belt to move beneath the tires without causing a log jam of tires on the transfer conveyor.

Figure 4:
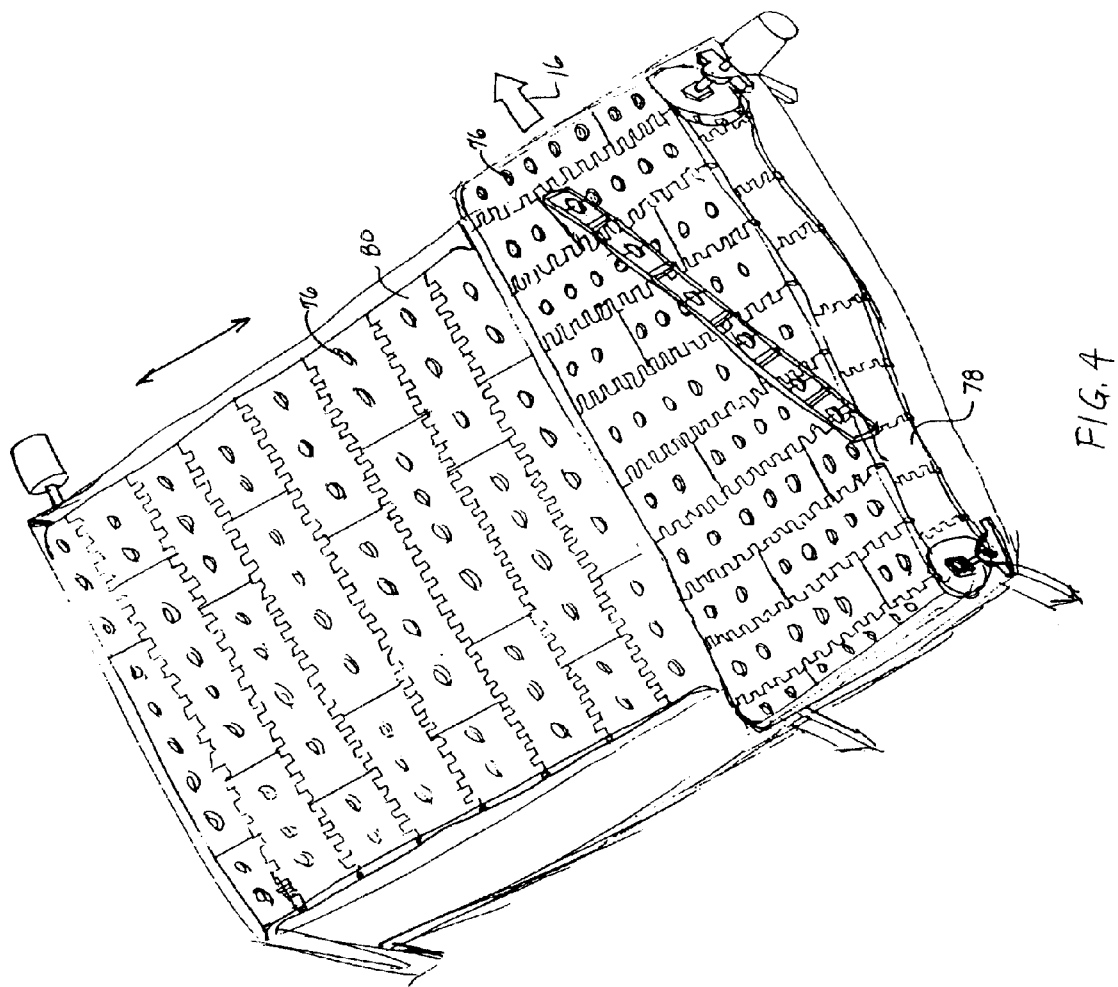
FIG. 4 is an isometric view of another version of an accumulation system usable in the conveyor line of FIG. 1.

Another version of accumulation system is shown in FIG. 4. The system is similar to that of FIG. 2, except that the cylindrical rollers 44, 70 of FIG. 2 are replaced by freely rotatable roller balls 76 in both the transfer belt 78 and the accumulation table belt 80. Because these balls can rotate in all directions, they are usable in this accumulation system. The backpressure forces the overflow off the side of the transfer conveyor onto the accumulation table. As this transfer occurs, the balls rotate generally about axes in the conveying direction 16. The axis of rotation of the balls during the transfer between the transfer conveyor and the accumulation table has at least a component of direction in the conveying direction.

Although the invention has been described in detail with respect to a few versions, those skilled in the art will readily appreciate that other versions are possible. For example, the main conveying line segments upstream and downstream of the transfer conveyor are mainly for illustrative and contextual purposes. As another example, the ball-top belt used in the accumulation table of FIG. 4 could alternatively be used as the accumulation table belt of FIG. 2. Likewise, the roller-top accumulation table belt of FIG. 2 could be used with the ball-top transfer belt of FIG. 4. The accumulation table, as another example, need not be a moving roller-top belt at all. It could be a stationary platform with a pusher bar that retracts to admit overflow and pushes against the accumulated articles to return them to the transfer conveyor. The accumulation table could be merely a tilted platform that uses gravity to urge accumulated articles back onto the transfer belt. In fact, any conventional accumulation table capable of receiving and returning articles to the roller-top transfer conveyor could be used in the invention. As yet another example, the guide rail can be permanently positioned or can be adjustable to allow for a variety of article sizes. As these few examples demonstrate, these and other modifications and alternative versions are intended to be included within the scope of the invention as defined in the following claims.

What is claimed is:

1. An accumulation system for a mass of articles conveyed along a conveyor line in a conveying direction, the system comprising:

a transfer conveyor forming a segment of the conveyor line and extending from an upstream end to a downstream end in the conveying direction and laterally from a first transfer side to an opposite second side;

an accumulation table disposed proximate the first transfer side of the transfer conveyor to receive articles from the transfer conveyor as the upstream supply of articles to the transfer conveyor exceeds the downstream demand for articles from the transfer conveyor and to deliver articles to the transfer conveyor as the downstream demand for articles exceeds the upstream supply;

wherein the transfer conveyor comprises a roller-top conveyor belt traveling in the conveying direction and including a plurality of rollers having salient portions extending from the belt to support conveyed articles and arranged to rotate about axes generally in the conveying direction to direct articles toward and to receive articles from the accumulation table at the first transfer side of the belt.

2. An accumulation system as in claim 1 wherein the transfer conveyor further includes axles oriented in the conveying direction and wherein the rollers are cylindrical with central bores to receive the axles.

3. An accumulation system as in claim 1 wherein the rollers are freely rotatable balls.

4. An accumulation system as in claim 1 further comprising a guide rail obliquely arranged above the belt with the upstream end of the guide rail closer than the downstream end to the second side of the transfer conveyor.

5. An accumulation system as in claim 1 wherein the accumulation table comprises a conveyor belt including article-supporting rollers arranged to rotate about axes parallel to the conveying direction of the conveyor line.

6. An accumulation system as in claim 1 wherein the accumulation table comprises a conveyor belt including freely rotatable article-supporting roller balls.

* * * * *